April 22, 1941.  L. H. LINDEMANN  2,239,108
WEED PULLER
Filed Dec. 26, 1939
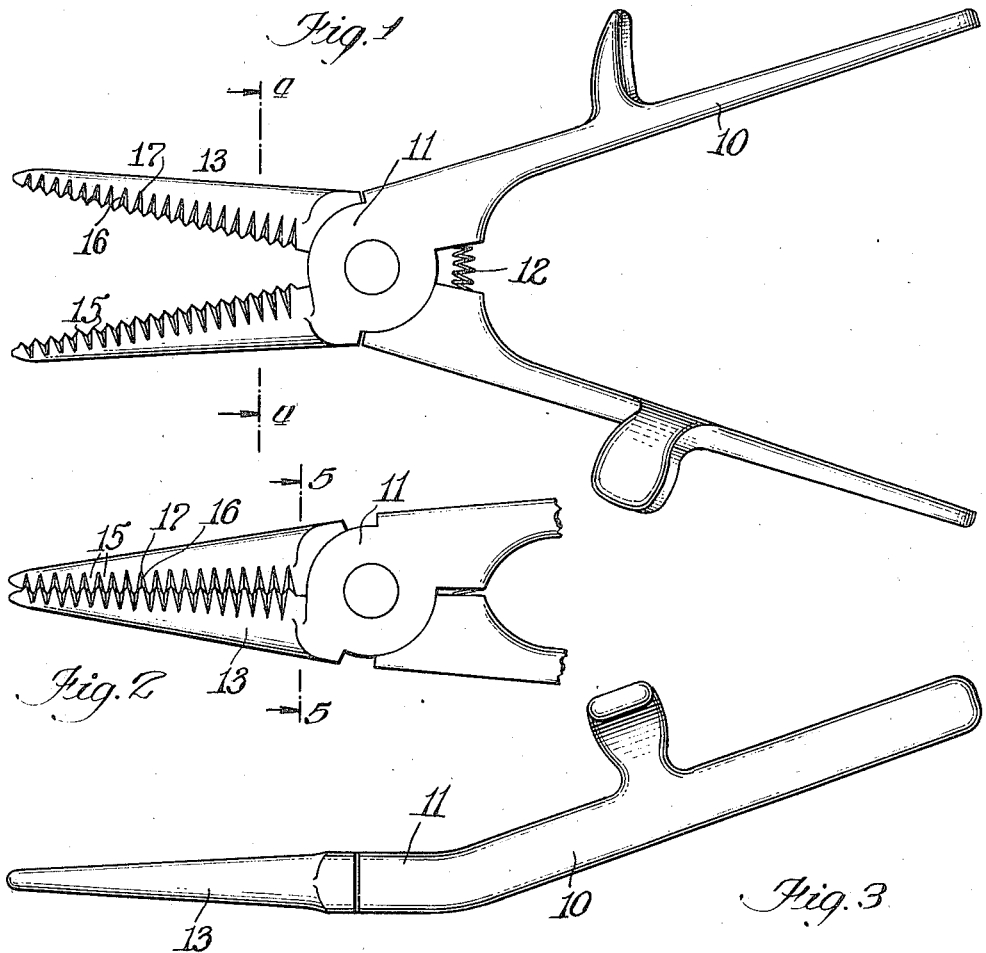
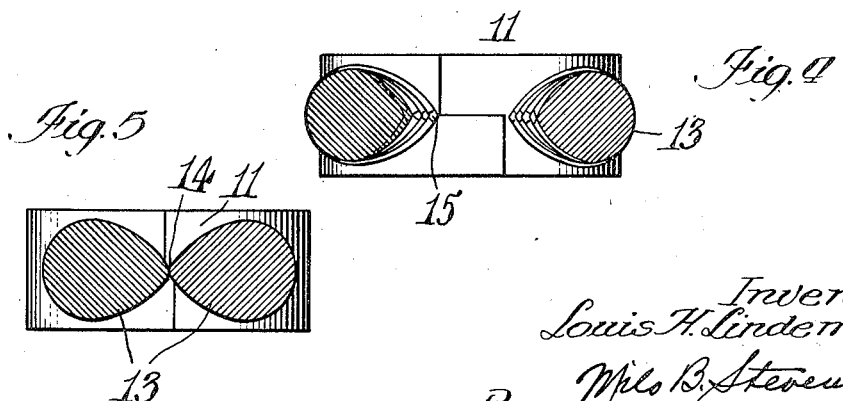
Inventor:
Louis H. Lindemann
By: Milo B. Stevens & Co.
Atty's.

Patented Apr. 22, 1941

2,239,108

UNITED STATES PATENT OFFICE 2,239,108

WEED PULLER

Louis H. Lindemann, Chicago, Ill.

Application December 26, 1939, Serial No. 311,046

3 Claims. (Cl. 294—118)

My invention relates to weed pullers, and more particularly to the plier or forceps type, and my main object is to provide an implement of this type which may be operated continuously without becoming clogged with weeds or hardened soil accumulations.

A further object of the invention is to provide a weed puller with jaws so formed as to grip only at points where they are applied and shed or avoid such material as occurs alongside of the immediate pulling zone.

Another object of the invention is to impart a formation to the origin of the implement jaws which divides and dissipates soil or other material which would have a tendency to pack and clog the implement.

An important object of the invention is to construct the same along lines of utmost simplicity, rigidity and durability.

With the above objects in view and with any others that may suggest themselves from the description to follow, a better understanding of the invention may be had by reference to the accompanying drawing, in which—

Fig. 1 is a top plan view of the novel weed puller in the normal or open position;

Fig. 2 is a fragmental duplication of Fig. 1, showing the weed puller closed or in the engaging position;

Fig. 3 is a side elevation of the implement; and

Figs. 4 and 5 are respectively enlarged sections along the lines 4—4 of Fig. 1 and 5—5 of Fig. 2.

Weed pullers of the plier or forceps type are not new in principle or form, but the disadvantage of those which have come to my attention are, first, that they are unduly complicated or delicate, and second, that they soon become clogged with portions of the weeds or packed soil, preventing their further operation. Obviously, a weed puller having the latter deficiency is a tedious and unsatisfactory implement to use, and it has therefore been my intention to provide an implement which not only performs its work freely and efficiently, but also has simplicity, strength and a neat appearance.

In accordance with the foregoing, it is noted that the general formation of the novel weed puller closely resembles that of a plier, except that the handles 10 are raised at an angle from the stock or base 11. Near the latter the handles contain opposed recesses to seat an expansive spring 12. The jaws 13 extend directly from the stock 11, so that they may operate at a low point or directly over the ground while the handles 10 are in an elevated and handy position.

The present invention resides mainly in the formation of the jaws 13. As noted, these taper toward their forward ends and are of substantially circular cross section in their outer portions. However, the jaws taper in an inward or transverse direction to a dull edge 14 which is formed a short distance from the stock 11 with a series of saw-teeth 15. These are so arranged that the teeth of one jaw mesh with those of the other when the jaws are closed, as indicated in Fig. 2.

In addition to having the toothed formation described, each jaw has its teeth defined by lateral grooves 16 which taper outwardly to points flush with the surfaces of the jaw, as indicated at 17. This formation lends each tooth similarity to a pyramid and distinction or separation from the adjoining tooth.

In a functional sense, the saw-tooth formation 15 of the jaws is primarily for exerting a positive grip upon the weeds or other plants which are to be pulled. However, the grooves 16 laterally of the spaces between the teeth serve to receive or lend clearance to the lateral portions of the weeds, so that these will not clog or interfere with the grip. Also, where the implement is used close to or upon the ground to pull weeds out with the roots, soil is apt to get in between the teeth, and the said grooves 16 form channels for the departure or dissipation of the soil from the gripping zone, so that the teeth themselves will not become clogged with either plant material or soil. Thus, when the next weed or plant is to be negotiated, the teeth will be clear of accumulations, and the jaws will secure full contact, as before.

The inner end portions 14 of the jaws have a dull knife edge, as previously mentioned, so that any plants or soil tending to clog or pack in the throat portion of the jaws will be divided and cast off by the edges referred to.

It will be evident from the above description that the novel formation of the jaws 13 lends the implement a high degree of efficiency, since the implement may be used repeatedly without its becoming clogged with plant material or soil. Further, the jaws 13 are of sturdy construction, so that in case extra force is to be employed to up-root a plant or weed, the implement may be given a twisting movement for additional leverage. Thus, the device may be contrasted with the common weed puller which is only applicable high above the ground and breaks the weed, whereas the present weed puller is applicable at a low point or even with the ground, so as to take hold of the thick portion or trunk of the weed, by means of which the weed may be pulled out with the roots. The novel implement therefore secures a permanent result and saves going over the same weeds repeatedly. Finally, it is apparent that the device is of very simple construction, having no delicate parts, and presenting a neat appearance.

While I have described the invention along specific lines, various minor changes or refinements may be made therein from time to time without departing from its principle, and I consider all such changes and refinements as coming within the scope and spirit of the appended claims.

I claim:

1. In a weed pulling implement of the forceps type, a pair of jaws provided with a transverse taper toward each other and formed with outwardly pointed and registering V-grooves on both sides to define pyramid-shaped teeth, said grooves providing means to prevent clogging of the teeth, the teeth of one jaw being staggered in respect to those of the other to mesh when the jaws are closed.

2. In a weed pulling implement of the forceps type, a pair of jaws provided with a transverse taper toward each other and formed with outwardly pointed and registering V-grooves on both sides to define pyramid-shaped teeth, said grooves providing means to prevent clogging of the teeth, the summits of these forming ridges whose bases meet in said grooves to form V-shaped hollows and impart saw-tooth profiles to the inner edges of the jaws, the teeth of one jaw being positioned to seat in the hollows of the other when the jaws are closed.

3. In a weed pulling instrument having pivoted jaws, meshing teeth to provide a gripping zone carried by said jaws, said teeth having grooves therebetween, said grooves extending laterally therefrom to provide passages for the dissipation of matter from the gripping zone.

LOUIS H. LINDEMANN.